N. FORD.
Grain-Drill.
No. {532, 31.536.}
Patented Feb. 26, 1861.
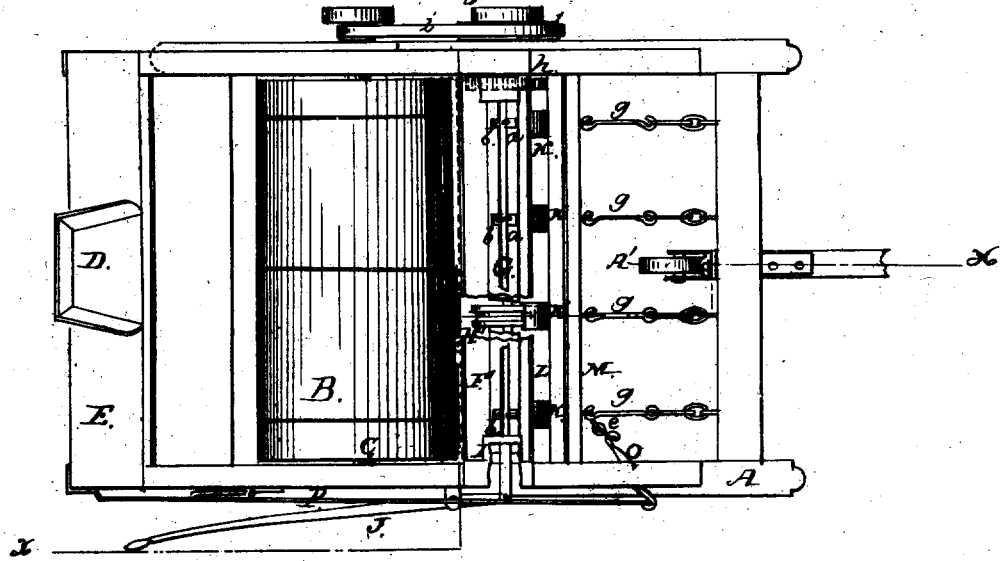
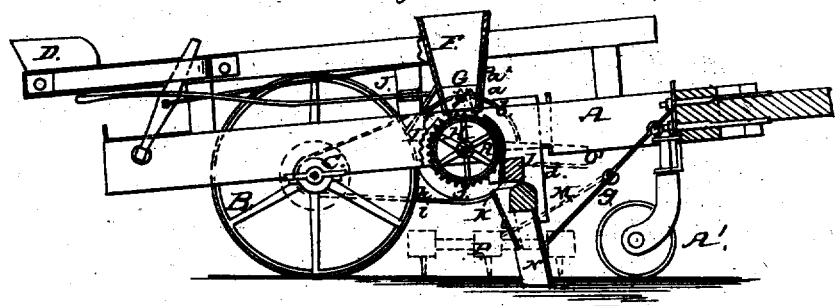
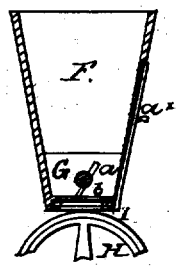
WITNESSES:
INVENTOR:
Nelson Ford
per Munn & Co
Attorneys

UNITED STATES PATENT OFFICE.

NELSON FORD, OF CAMBRIDGE, WISCONSIN.

IMPROVEMENT IN SEEDING-MACHINES.

Specification forming part of Letters Patent No. 31,536, dated February 26, 1861.

*To all whom it may concern:*

Be it known that I, NELSON FORD, of Cambridge, in the county of Dane and State of Wisconsin, have invented a new and Improved Seeding-Machine; and I do hereby declare that the following is a full, clear, and exact description of the same, reference being had to the annexed drawings, making part of this specification, in which—

Figure 1 is a plan or top view of my invention. Fig. 2 is a side sectional view of the same, taken in line $x\,x$, Fig. 1; Fig. 3, an enlarged section of the hopper and seed-distributing device.

Similar letters of reference indicate corresponding parts in the three figures.

This invention relates to an improvement in that class of seeding-machines which are designed for sowing seed broadcast and in drills.

The object of the invention is to obtain a simple and efficient means for distributing the seed, so that the same may be sown very evenly and without any liability of the distributing device becoming choked or clogged.

To enable those skilled in the art to fully understand and construct my invention, I will proceed to describe it.

A represents a rectangular frame, mounted on a roller, B, which may be made in sections, placed on a common shaft or axle, C, the sections on one part of the shaft being placed loosely on their shaft, while the other sections are attached permanently to it. This arrangement merely facilitates the turning of the machine. The front part of the frame is supported by a caster-wheel, A'.

D is the driver's seat, which is placed on a cross-bar, E, at the back end of the frame A, and F is a hopper, which is placed transversely on the frame A and extends entirely across it.

Within the hopper F there is placed longitudinally a shaft, G, to which a series of short arms, $a$, are attached transversely. The shaft G is allowed to rotate freely within the hopper F, and the arms $a$ are directly over slots or openings $b$ in the bottom of the hopper, the arms $a$, as the shaft G rotates, extending down to the slots.

Directly below the bottom of the hopper F there is placed a shaft, H, on which wheels H' are placed, a wheel H' being in line with each slot $b$ in the bottom of the hopper.

I is a slide, which is fitted to the under side of the bottom of the hopper. This slide is perforated with holes and forms a register, by adjusting which the capacity of the slots or openings $b$ may be regulated as desired. The slide I is adjusted by means of a lever, J, attached to one side of the frame A.

The wheels H' have their peripheries grooved circumferentially, as shown clearly in Fig. 1.

When the machine is used for sowing seed in drills there are a series of curved or segment spouts, K, attached to a bar, L, secured transversely to the frame A. A wheel, H, works in each spout K. Just below the bar L there is placed a similar bar, M, the ends of which are fitted in the same pendants, $d\,d$. The bar M, however, is allowed to turn freely in the pendants $d\,d$. To the bar M there are attached spouts, N which are in line with the spouts K. The bar M may be turned at any time so as to raise the spouts K free from the ground by actuating a lever, O, by means of a rod, P, the lever O being connected to one end of the bar M, or to a spout, K, thereof, by a chain, $e$. The spouts K are connected to the front cross-bars, $f$, of the frame A by chains $g$, which serve as stays. The lower ends of the spouts K serve as shares to make the drills or furrows to receive the seed.

At the front side of the hopper F there are placed a series of slides, $a^x$, the lower ends of which are rounded to fit the grooves of the wheels H'. These slides $a^x$ serve as cut-offs, and by being properly adjusted prevent the escape of seed when not required.

The operation is as follows: As the machine is drawn along the shaft G is rotated by gears $h$ and a belt, $i$, from the shaft or axle C, and the arms $a$ of the shaft G force the seed through the slots or openings $b$ of the bottom of the hopper, and the seed passes into the grooves of the wheels H', which are rotated in consequence of the band $i$ passing over a pulley, $j$, of shaft G. The wheels H' convey the seed to the spouts K and discharge it therein, the seed passing down through the spouts N into the drills or furrows.

When it is designed to sow seed broadcast the bars L M are removed and a scattering-board, O', used instead. This board is shown in red in Fig. 1. A drag, P, (shown in red,) is also attached to the frame A when the scattering-board O' is used. The board O' is so placed as to receive the seed from the wheels, and scatter the seed as the latter passes over. The arms $a$ insure the seed passing through the slots or openings $b$, and the grooved wheels H' carry the same to the spouts K or scattering-board O'. The grooved wheels H' discharge the seed freely, and the grooves are not liable to choke or clog, as is the case where cells or holes are employed in rotating wheels for discharging the seed.

Having thus described my invention, what I claim as new, and desire to secure by Letters Patent, is—

The combination of the revolving arms $a$ of shaft G within the hopper F, in connection with the slots or openings $b$ in the bottom of the hopper and the wheels H' below the hopper, the wheels being provided with grooved peripheries, and all arranged substantially as and for the purpose set forth.

NELSON FORD.

Witnesses:
Z. CAMPBELL,
THOMAS SLAGG.